Patented Oct. 22, 1935

2,018,644

UNITED STATES PATENT OFFICE 2,018,644

PLASTIC RUBBER PRODUCT

Ira Williams, Woodstown, and Carroll Cummings Smith, Carneys Point, N. J., assignors to E. I. du Pont de Nemours & Company, Wilmington, Del., a corporation of Delaware No Drawing. Application July 6, 1934, Serial No. 733,967

28 Claims. (Cl. 18—50)

This invention relates to rubber and more particularly to the preparation of more plastic rubber products.

In the preparation of rubber products, it is usually desirable to have the rubber in a plastic condition so as to facilitate the processing operations. For example, it is desirable to have the rubber in a plastic condition when adding fillers, vulcanizing ingredients and the like. It is also desirable to have the rubber in a plastic condition to facilitate shaping and molding of the rubber prior to vulcanization. It is well known that rubber, when subjected to mechanical working such as is obtained by the use of a rubber mill, particularly in the presence of oxygen, is rendered much more plastic. The degree of plasticizing is determined to a great extent by the temperature and the time of milling. When milled for a sufficient length of time, the rubber will become very soft. However, extended milling of rubber tends to destroy the internal structure of the rubber and produces a final product of very inferior physical properties.

In order to reduce the time of milling and to avoid the deteriorating action of extended milling, it has become common practice to add to the rubber, during the milling operation, certain materials which assist in softening the rubber. The materials which are most commonly employed are oils, esters, waxes, fats, alcohols, acids, resins and the like which assist in the production of soft rubber either by a swelling action on the rubber or by acting as a lubricant. Some of the most common softeners are mineral oil, pine tar, palm oil, rosin oil, dibutyl phthalate, paraffin, glycerine, lauryl alcohol and stearic acid. It is also known that certain chemicals, such as diphenyl guanidine, have a slight softening action on the rubber while other chemicals, such as benzidine, have a considerable stiffening action.

Rubber which has been subjected to the action of swelling agents, such as mineral oil, kerosene and similar materials, is softened merely by the distending action of the swelling material. The degree of softening and swelling by the use of these materials can be increased until the rubber assumes the consistency of a soft jelly or cement. When such rubber is compounded with the usual vulcanizing agents and vulcanized, the swelling action of the softener persists and the vulcanized rubber has a low modulus of elasticity and is inferior for many purposes.

Rubber is probably composed of micelles which, in turn, consist of a large number of molecules. The softness or plasticity of the rubber is largely determined by the state of gelation and size of the micelles. Any reduction in the degree of association of the micelles or any means which will reduce the size of the micelle will result in a softening action. Such action is shown by certain accelerators, such as diphenyl guanidine, although the effect is not great. The type of softening produced by the use of peptizing agents is desirable because the effect is almost entirely destroyed during vulcanization.

An object of the present invention is to provide a class of materials which, when added to rubber, will produce a greater plasticizing action than those previously employed. A further object is to provide a class of materials which will cause a softening action on rubber when used in relatively small amounts without producing a material swelling or dissolving action on the rubber. A still further object is to supply a class of plasticizers for rubber, the effect of which, is largely destroyed during vulcanization. Other objects are to provide new compositions of matter and to advance the art. Still other objects will appear hereinafter.

These objects may be accomplished in accordance with our invention which comprises subjecting rubber to the action of small amounts of certain plasticizing agents for a sufficient length of time for the rubber to attain the desired plasticity. The resulting compositions will be more plastic than other rubber compositions heretofore prepared, will produce products having improved physical properties and will be in a condition whereby they may be more easily worked in processing operations.

The plasticizing agents of our invention comprise a class of salts of unsymmetrically substituted hydrazines having the formula:

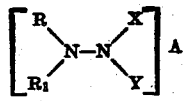

wherein R represents an alkyl, aralkyl or aryl nucleus; $R_1$ represents hydrogen or an alkyl, aralkyl or aryl nucleus; X represents hydrogen, one valence of a doubly bonded carbon atom, or an alkyl, aralkyl or aryl nucleus except that X must be of a different class than R when $R_1$ represents hydrogen; Y represents hydrogen or one valence of a doubly bonded carbon atom and A represents one equivalent of a salt-forming acid-reacting compound. R and $R_1$ may also represent terminal carbon atoms of a cyclic group in which the nitrogen to which they are attached forms part of the cycle as in the morpholyl, piperidyl, and like groups.

The statement that X must be of a different class than R when $R_1$ is hydrogen, means that X must not be aryl when R is aryl and $R_1$ is hydrogen; that X must not be alkyl when R is alkyl and $R_1$ is hydrogen; and X must not be aralkyl when R is aralkyl and $R_1$ is hydrogen. In other words, we specifically exclude from within the scope of our invention salts of compounds having the formula:

wherein both R and X represent alkyl nuclei, or represent aralkyl nuclei, or represent aryl nuclei.

One valence of a doubly bonded carbon atom, as employed in the specification and in the claims, will be understood to include compounds in which both the X and the Y valences are connected to the same carbon atom as in compounds represented by the formula:

and to include compounds in which the valence is of a carbon atom which is doubly bonded to some element other than carbon as in the compounds represented by the formulæ:

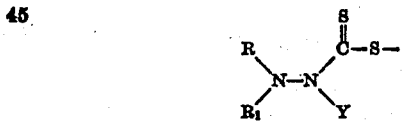

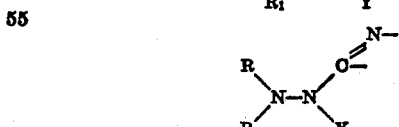

By the expression "an alkyl, aralkyl or aryl nucleus", it will be understood that the indicated group is bonded to the nitrogen directly by means of a carbon atom of such nucleus. Such nuclei may contain hydroxy, alkoxy, nitro, halogen or amino substituents. Also, the term "alkyl" will be understood to include both saturated and unsaturated aliphatic hydrocarbon nuclei.

It will thus be apparent that the compounds of our invention, in general comprise neutral and acid salts of mono substituted, asymmetrical disubstituted, unbalanced disubstituted and trisubstituted hydrazines. The acidic substances which are employed to prepare the salts may be either organic or inorganic acidic substances of a strength sufficient to form a salt when added to the hydrazine or by fusing the hydrazine and acidic substances together or by reacting in a relatively non-polar solvent, such as dry benzene.

The use of our class of softening agents permits the production of rubber which is well plasticized with the employment of little or no milling. In order that the ruber be plasticized, it is only necessary to incorporate, in the rubber, a small amount of an agent of our invention. The plasticizing agents may be incorporated in the rubber by milling, employing the minimum amount of milling required for that purpose. The plasticizing agents may be applied to the surface of thin sheets of rubber either by dipping in any of the agents which are liquids or in solutions of the agents or by spraying the liquids or solutions on the surface of the rubber and even by dusting the solid compounds on the surface of the rubber. When our agents are brought into contact with the surface of the rubber by any of such methods, the agent will diffuse into the rubber and exert its softening effect.

The change in the state of the rubber gel induced by our compounds is not instantaneous but requires more or less time to develop. While a small immediate effect may result, it is, in general, not great enough to be noticeable. After incorporating one of our compounds into the rubber, the rubber soon becomes softened and the softening action continues at a gradually decreasing rate until an apparent equilibrium is reached, after which, little or no softening action takes place. The length of time, required to reach this equilibrium condition, varies considerably for different compounds and depends to a large extent upon the amount of agent added and the temperature to which the rubber is subjected. The length of time required decreases rapidly with increase in the temperature. A beneficial softening action will, in general, be noticed in periods of time which may vary from 15 minutes to one or two days.

The amount of softening, which will be obtained over a given period of time, will vary with the amount of plasticizing agent which is employed. However, the increase in softening effect of increased amounts of agent is not in proportion to the amount of agent added. The amount of agent to be added may be varied within an extremely wide range, depending upon the rubber, the other compounding ingredients and the desire of the user. However, for economical reasons, it will generally be found that from about .1 to about 5% of the agent will be sufficient for most purposes. Hence, it will be seen that the extent of the softening can be largely controlled by control of the time, temperature and concentration of the plasticizing agent.

As a means of measuring the effectiveness of these materials for reducing the plasticity of rubber, small amounts of the various materials were incorporated into the rubber with the minimum amount of milling required to make a homogeneous mixture. The relative plasticity was determined by measuring the thickness of a 2 cubic centimeter pellet after being pressed between parallel plates under a load of 2 kg. for 5 minutes at 70° C. These tests were made one hour after milling. The controls were milled in the same manner and for the same length of time as the treated portions of rubber. The plasticity number is the final thickness of the pellets in inches.

The results of such tests are shown in the following table:

Table I

| Material | Grams in 100 gr. rubber | Plasticity number | |
|---|---|---|---|
| | | Treated sample | Control |
| Phenylhydrazine formate | .85 | .240 | .270 |
| b-naphthol salt of phenylhydrazine | 1.25 | .252 | .325 |
| Phenol salt of phenylhydrazine | 1.00 | .255 | .325 |
| Phenylhydrazine stearate | 1.00 | .239 | .313 |
| Phenylhydrazine oxalate | .50 | .275 | .297 |
| Phenylhydrazine hydrochloride | 1.00 | .266 | .308 |
| o-tolyl hydrazine nitrate | 1.00 | .245 | .297 |
| Asymmetrical methyl phenylhydrazine sulfate | .25 | .290 | .307 |
| o-xenyl hydrazine sulfate | .50 | .285 | .307 |
| Alpha naphthyl hydrazine hydrochloride | 1.00 | .260 | .313 |
| 2:5-dichlor phenylhydrazine acetate | 1.00 | .279 | .302 |
| m-nitro phenylhydrazine stearate | 1.00 | .267 | .297 |
| N, N' b-hydroxy-ethyl phenylhydrazine benzoate | 1.00 | .259 | .297 |
| Asymmetric diphenyl hydrazine phthalate | 1.00 | .277 | .297 |
| Asymmetric phenyl methyl hydrazine phosphate | 1.00 | .273 | .294 |
| Phenylhydrazine SO₂ reaction product | .75 | .240 | .265 |

Other salts which have proved to be particularly effective for our purpose are the reaction products of phenyl hydrazine and carbon dioxide, ethyl sulphonyl derivative of 2:5-dichlorphenyl hydrazine and o-tolyl hydrazonium salt of the dithiocarbamic acid derived from o-tolyl hydrazine.

In general, salts, which will be found effective for our purpose, may be prepared from the following hydrazines:

Phenyl hydrazine
o-tolyl hydrazine
o-xenyl hydrazine
a-naphthyl hydrazine
m-nitrophenyl hydrazine
N,N' B-hydroxy-ethyl phenyl hydrazine
Asymmetrical diphenyl hydrazine
Asymmetrical phenyl methyl hydrazine
2:5-dichlorphenyl hydrazine
Acetone phenyl hydrazone
Asymmetrical di-lauryl hydrazine
N,N' phenyl benzyl hydrazine
Mono-acetyl phenyl hydrazine
The thio urea resulting from the action of phenyl mustard oil on phenyl hydrazine
Benzoyl derivative of 2:5-dichlorphenyl hydrazine
p-nitrophenyl hydrazine
Phenyl hydrazine formaldehyde reaction product
Methyl propyl ketone phenyl hydrazone Other hydrazines whose salts merit special attention are:

Asymmetrical di-tolyl hydrazines
Asymmetrical di-xylyl hydrazines
Asymmetrical di-biphenyl hydrazines
Asymmetrical di-naphthyl hydrazines
Asymmetrical phenyl tolyl hydrazines
Asymmetrical phenyl biphenyl hydrazines
Asymmetrical phenyl naphthyl hydrazines
Asymmetrical tolyl naphthyl hydrazines
Asymmetrical di-benzyl hydrazines
Asymmetrical phenyl benzyl hydrazines
Asymmetrical di-hydroxyphenyl hydrazines
Asymmetrical di-chlorphenyl hydrazines
Asymmetrical di-p-aminophenyl hydrazines
Asymmetrical phenyl phenol hydrazines
Asymmetrical tolyl phenol hydrazines
Asymmetrical di-anisyl hydrazines
Asymmetrical phenyl anisyl hydrazines
Asymmetrical methyl phenyl hydrazines
Mono xylyl hydrazines
Mono o-biphenyl hydrazines
Mono hydroxy phenyl hydrazines
Mono benzyl hydrazines
Mono chlorphenyl hydrazines
Mono aminophenyl hydrazines
Mono anisyl hydrazines
Mono methyl hydrazines
Mono lauryl hydrazines
Dichlorphenyl hydrazines
Nitrophenyl hydrazines The above hydrazines and other hydrazines heretofore mentioned may be employed as the salts of any acid reacting compound which is sufficiently strongly acid to react with the hydrazines to form the salts. Among the acidic substances which may be employed to form the salts are:

Phenol
b-naphthol
Cresols
Alpha naphthol
Xylenols
Catechol
Dihydroxy naphthalenes
Dihydroxy biphenyls
Formic acid
Stearic acid
Oxalic acid
Acetic acid
Benzoic acid
Phthalic acid
Propionic acid
Butyric acid
Oleic acid
Palmitic acid
Sulfonic acids
Naphthoic acid
Phenyl benzoic acid
Phenyl naphthoic acid
Naphthyl benzoic acid
Naphthyl naphthoic acid
Halogen substituted acids
Chlor acetic acids (mono- and di-
Anthranilic acids
Hydrochloric acid
Nitric acid
Sulfuric acid
Phosphoric acid
Sulphur dioxide
Carbon dioxide
Ethyl sulfonic acid
Dithiocarbamic acid of phenyl hydrazine
Dithiocarbamic acid of o-tolyl hydrazine
Other dithiocarbamic acids It will be apparent that a wide variety of hydrazine salts may be employed. Within the limits of the type formula:

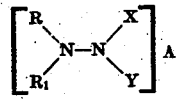

as defined hereinbefore, the components R, R₁ and X may represent methyl, ethyl, propyl, butyl, isobutyl, tertiary butyl, amyl, isoamyl, allyl, crotyl, butylene, lauryl, stearyl or other saturated or unsaturated alkyl group or may be benzyl, ring substituted benzyl, naphthyl methyl or other aralkyl groups or may be substituted or unsubstituted aromatic radicals such as dimethylphenyl, ethylphenyl, nitrophenyl, chlorphenyl, aminophenyl, chlornaphthyl, nitronaphthyl, alkylnaphthyl, biphenyl, alkylbiphenyl, chlorbiphenyl, nitrobiphenyl, aminobiphenyl, cyclohexyl, and the like, or other groups which are generally known to be aliphatic or aromatic in nature.

The hydrazines disclosed herein are, in general, well known compounds and the methods of preparing the same are also well known and described in the literature. The salts, may be formed simply by bringing the hydrazine and the required acidic substance into intimate contact or by fusing them together. Since the hydrazines are only weakly basic, the formation of the salts is sometimes accomplished in a more favorable manner by carrying out the addition in a non-aqueous solvent such as dry benzene and the like, particularly, in the absence of water. For this reason, it is obvious that, for the purpose of this invention, the hydrazine and the acid may be added to the rubber separately and the required salt formed within the rubber. For example, we have found that phenyl hydrazine will combine with stearic acid more readily in benzene solution and that o-tolyl hydrazine will unite with oxalic acid more readily in ether solution. In a similar manner, we have found the phenylhydrazine and stearic acid may be added separately to the rubber and still produce a desirable softening action. Any acidic substance, either organic or inorganic of a strength sufficient to form a salt under such circumstances, may be employed to form the corresponding salt which will be effective for our purpose.

While we have disclosed the preferred embodiments of our invention, it will be readily apparent to those skilled in the art that many changes and variations may be made therein without departing from the spirit of our invention. Accordingly, the scope of our invention is to be limited solely by the appended claims construed as broadly as is permissible in view of the prior art.

We claim:
1. Unvulcanized rubber of increased plasticity obtainable by subjecting the rubber to action of a salt of an unsymmetrically substituted hydrazine which salt has the formula

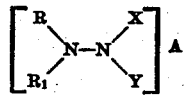

wherein R represents an alkyl, aralkyl or aryl nucleus; R₁ represents hydrogen or an alkyl, aralkyl or aryl nucleus; X represents hydrogen, one valence of a doubly bonded carbon atom, or an alkyl, aralkyl or aryl nucleus, except that X must be of a different class than R when R₁ represents hydrogen; Y represents hydrogen or one valence of a doubly bonded carbon atom; and A represents one equivalent of a salt-forming acid-reacting compound, for a sufficient length of time to produce an increase in the plasticity of the rubber.

2. In the process of making rubber articles, the step which comprises subjecting unvulcanized rubber to the action of a salt of an unsymmetrically substituted hydrazine, which salt has the formula

wherein R represents an alkyl, aralkyl or aryl nucleus; R₁ represents hydrogen or an alkyl, aralkyl or aryl nucleus; X represents hydrogen, one valence of a doubly bonded carbon atom, or an alkyl, aralkyl or aryl nucleus, except that X must be of a different class than R when R₁ represents hydrogen; Y represents hydrogen or one valence of a doubly bonded carbon atom; and A represents one equivalent of a salt-forming acid-reacting compound, for a sufficient length of time to produce an increase in the plasticity of the rubber.

3. In the process of making rubber articles, the step which comprises subjecting unvulcanized rubber to the action of a salt of an unsymmetrically substituted hydrazine containing at the most 3 substituent groups, in which each of the substituent groups is an organic group having a carbon atom thereof directly bonded to a nitrogen of the hydrazine nucleus, for a sufficient length of time to produce an increase in the plasticity of the rubber.

4. In the process of making rubber articles, the step which comprises subjecting unvulcanized rubber to the action of a salt of an unsymmetrically substituted hydrazine containing at the most 2 substituent groups, in which each of the substituent groups is an organic group having a carbon atom thereof directly bonded to a nitrogen of the hydrazine nucleus, for a sufficient length of time to produce an increase in the plasticity of the rubber.

5. In the process of making rubber articles, the step which comprises subjecting unvulcanized rubber to the action of a salt of a mono-substituted hydrazine, in which the substituent is an organic group having a carbon atom thereof directly bonded to a nitrogen of the hydrazine nucleus, for a sufficient length of time to produce an increase in the plasticity of the rubber.

6. In the process of making rubber articles, the step which comprises subjecting unvulcanized rubber to the action of a salt of a mono-substituted hydrazine, in which the substituent is an aromatic group having a carbon atom thereof directly bonded to a nitrogen of the hydrazine nucleus, for a sufficient length of time to produce an increase in the plasticity of the rubber.

7. In the process of making rubber articles, the step which comprises subjecting unvulcanized rubber to the action of a salt of an unsymmetrically di-substituted hydrazine, in which each substituent is an organic group having a carbon atom thereof directly bonded to a nitrogen of the hydrazine nucleus, for a sufficient length of time to produce an increase in the plasticity of the rubber.

8. In the process of making rubber articles the step which comprises subjecting unvulcanized rubber to the action of a salt of an asymmetrical di-substituted hydrazine, in which each substituent is an organic group having a carbon atom thereof directly bonded to a nitrogen of the hydrazine nucleus, for a sufficient length of time to produce an increase in the plasticity of the rubber.

9. In the process of making rubber articles, the step which comprises subjecting unvulcanized rubber to the action of a salt of an asymmetrical dialkyl substituted hydrazine, in which each alkyl group has a carbon atom thereof directly bonded to a nitrogen of the hydrazine nucleus, for a sufficient length of time to produce an increase in the plasticity of the rubber.

10. In the process of making rubber articles, the step which comprises subjecting unvulcanized rubber to the action of a salt of an N, N′ di-substituted hydrazine, in which one substituent is an aromatic radical having a carbon atom of the aromatic ring directly bonded to one nitrogen of the hydrazine nucleus and the other substituent is an aliphatic radical having a carbon atom thereof directly bonded to the other nitrogen of the hydrazine nucleus, for a sufficient length of time to produce an increase in the plasticity of the rubber.

11. In the process of making rubber articles, the step which comprises subjecting unvulcanized rubber to the action of a salt of an inorganic acid and an unsymmetrically substituted hydrazine which salt has the formula

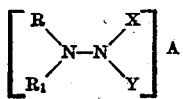

wherein R represents an alkyl, aralkyl or aryl nucleus; R₁ represents hydrogen or an alkyl, aralkyl or aryl nucleus; X represents hydrogen, one valence of a doubly bonded carbon atom, or an alkyl, aralkyl or aryl nucleus, except that X must be of a different class than R when R₁ represents hydrogen; Y represents hydrogen or one valence of a doubly bonded carbon atom; and A represents one equivalent of an inorganic acid, for a sufficient length of time to produce an increase in the plasticity of the rubber.

12. In the process of making rubber articles, the step which comprises subjecting unvulcanized rubber to the action of a salt of an inorganic acid and an unsymmetrically substituted hydrazine containing at the most 2 substituent groups, in which each of the substituent groups is an organic group having a carbon atom thereof directly bonded to a nitrogen of the hydrazine nucleus, for a sufficient length of time to produce an increase in the plasticity of the rubber.

13. In the process of making rubber articles, the step which comprises subjecting unvulcanized rubber to the action of a salt of an inorganic acid and a mono-substituted hydrazine, in which the substituent is an organic group having a carbon atom thereof directly bonded to a nitrogen of the hydrazine nucleus, for a sufficient length of time to produce an increase in the plasticity of the rubber.

14. In the process of making rubber articles, the step which comprises subjecting unvulcanized rubber to the action of a salt of an inorganic acid and an unsymmetrically di-substituted hydrazine, in which each substituent is an organic group having a carbon atom thereof directly bonded to a nitrogen of the hydrazine nucleus, for a sufficient length of time to produce an increase in the plasticity of the rubber.

15. In the process of making rubber articles, the step which comprises subjecting unvulcanized rubber to the action of a salt of an organic acid and an unsymmetrically substituted hydrazine which salt has the formula

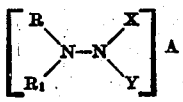

wherein R represents an alkyl, aralkyl or aryl nucleus; R₁ represents hydrogen or an alkyl, aralkyl or aryl nucleus; X represents hydrogen, one valence of a doubly bonded carbon atom, or an alkyl, aralkyl or aryl nucleus, except that X must be of a different class than R when R₁ represents hydrogen; Y represents hydrogen or one valence of a doubly bonded carbon atom; and A represents one equivalent of an organic acid, for a sufficient length of time to produce an increase in the plasticity of the rubber.

16. In the process of making rubber articles, the step which comprises subjecting unvulcanized rubber to the action of a salt of an organic acid and an unsymmetrically substituted hydrazine containing at the most 2 substituent groups, in which each of the substituent groups is an organic group having a carbon atom thereof directly bonded to a nitrogen of the hydrazine nucleus, for a sufficient length of time to produce an increase in the plasticity of the rubber.

17. In the process of making rubber articles, the step which comprises subjecting unvulcanized rubber to the action of a salt of an organic acid and a mono-substituted hydrazine, in which the substituent is an organic group having a carbon atom thereof directly bonded to a nitrogen of the hydrazine nucleus, for a sufficient length of time to produce an increase in the plasticity of the rubber.

18. In the process of making rubber articles, the step which comprises subjecting unvulcanized rubber to the action of a salt of an organic acid and an unsymmetrically di-substituted hydrazine, in which each substituent is an organic group having a carbon atom thereof directly bonded to a nitrogen of the hydrazine nucleus, for a sufficient length of time to produce an increase in the plasticity of the rubber.

19. Unvulcanized rubber of increased plasticity obtainable by subjecting the rubber to the action of a salt of an unsymmetrically substituted hydrazine containing at the most 3 substituent groups, in which each of the substituent groups is an organic group having a carbon atom thereof directly bonded to a nitrogen of the hydrazine nucleus, for a sufficient length of time to produce an increase in the plasticity of the rubber.

20. Unvulcanized rubber of increased plasticity obtainable by subjecting the rubber to the action of a salt of an unsymmetrically substituted hydrazine containing at the most 2 substituent groups, in which each of the substituent groups is an organic group having a carbon atom thereof directly bonded to a nitrogen of the hydrazine nucleus, for a sufficient length of time to produce an increase in the plasticity of the rubber.

21. Unvulcanized rubber of increased plasticity obtainable by subjecting the rubber to the action of a salt of a mono-substituted hydrazine, in which the substituent is an organic group having a carbon atom thereof directly bonded to a nitrogen of the hydrazine nucleus, for a sufficient length of time to produce an increase in the plasticity of the rubber.

22. Unvulcanized rubber of increased plasticity obtainable by subjecting the rubber to the action of a salt of an unsymmetrically di-substituted hydrazine, in which each substituent is an organic group having a carbon atom thereof directly bonded to a nitrogen of the hydrazine nucleus, for a sufficient length of time to produce an increase in the plasticity of the rubber.

23. Unvulcanized rubber of increased plasticity obtainable by subjecting the rubber to the action of a salt of an inorganic acid and an unsymmetrically substituted hydrazine which salt has the formula

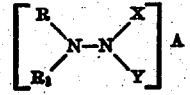

wherein R represents an alkyl, aralkyl, or aryl nucleus; $R_1$ represents hydrogen or an alkyl, aralkyl or aryl nucleus; X represents hydrogen, one valence of a doubly bonded carbon atom, or an alkyl, aralkyl or aryl nucleus, except that X must be of a different class than R when $R_1$ represents hydrogen; Y represents hydrogen or one valence of a doubly bonded carbon atom; and A represents one equivalent of an inorganic acid, for a sufficient length of time to produce an increase in the plasticity of the rubber.

24. Unvulcanized rubber of increased plasticity obtainable by subjecting the rubber to the action of a salt of an inorganic acid and an unsymmetrically substituted hydrazine containing at the most 2 substituent groups, in which each of the substituent groups is an organic group having a carbon atom thereof directly bonded to a nitrogen of the hydrazine nucleus, for a sufficient length of time to produce an increase in the plasticity of the rubber.

25. Unvulcanized rubber of increased plasticity obtainable by subjecting the rubber to the action of a salt of an organic acid and an unsymmetrically substituted hydrazine which salt has the formula

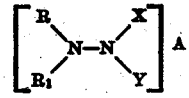

wherein R represents an alkyl, aralkyl or aryl nucleus; $R_1$ represents hydrogen or an alkyl, aralkyl or aryl nucleus; X represents hydrogen, one valence of a doubly bonded carbon atom, or an alkyl, aralkyl or aryl nucleus, except that X must be of a different class than R when $R_1$ represents hydrogen; Y represents hydrogen or one valence of a doubly bonded carbon atom; and A represents one equivalent of an organic acid, for a sufficient length of time to produce an increase in the plasticity of the rubber.

26. Unvulcanized rubber of increased plasticity obtainable by subjecting the rubber to the action of a salt of an organic acid and an unsymmetrically substituted hydrazine containing at the most 2 substituent groups, in which each of the substituent groups is an organic group having a carbon atom thereof directly bonded to a nitrogen of the hydrazine nucleus, for a sufficient length of time to produce an increase in the plasticity of the rubber.

27. In the process of making rubber articles, the step which comprises subjecting the unvulcanized rubber to the action of phenylhydrazine oxalate for a sufficient length of time to produce an increase in the plasticity of the rubber.

28. In the process of making rubber articles, the step which comprises subjecting the unvulcanized rubber to the action of phenylhydrazine hydrochloride for a sufficient length of time to produce an increase in the plasticity of the rubber.

IRA WILLIAMS.
CARROLL C. SMITH.